April 26, 1949.　　　H. KIRKHAM　　　2,468,079
RELIEF VALVE

Filed June 21, 1943　　　　　　　　　2 Sheets-Sheet 1

INVENTOR.
HALL KIRKHAM
BY
ATTORNEYS

April 26, 1949. H. KIRKHAM 2,468,079
RELIEF VALVE
Filed June 21, 1943 2 Sheets-Sheet 2
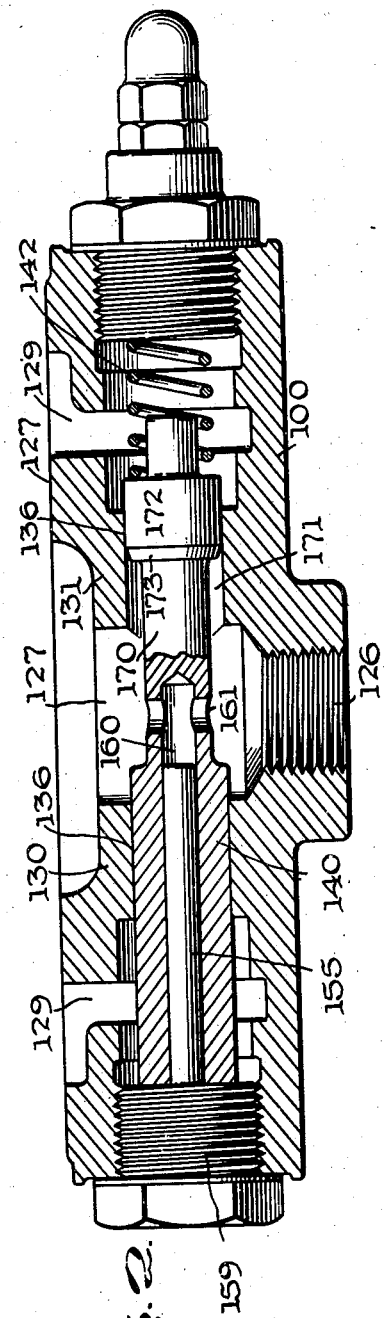
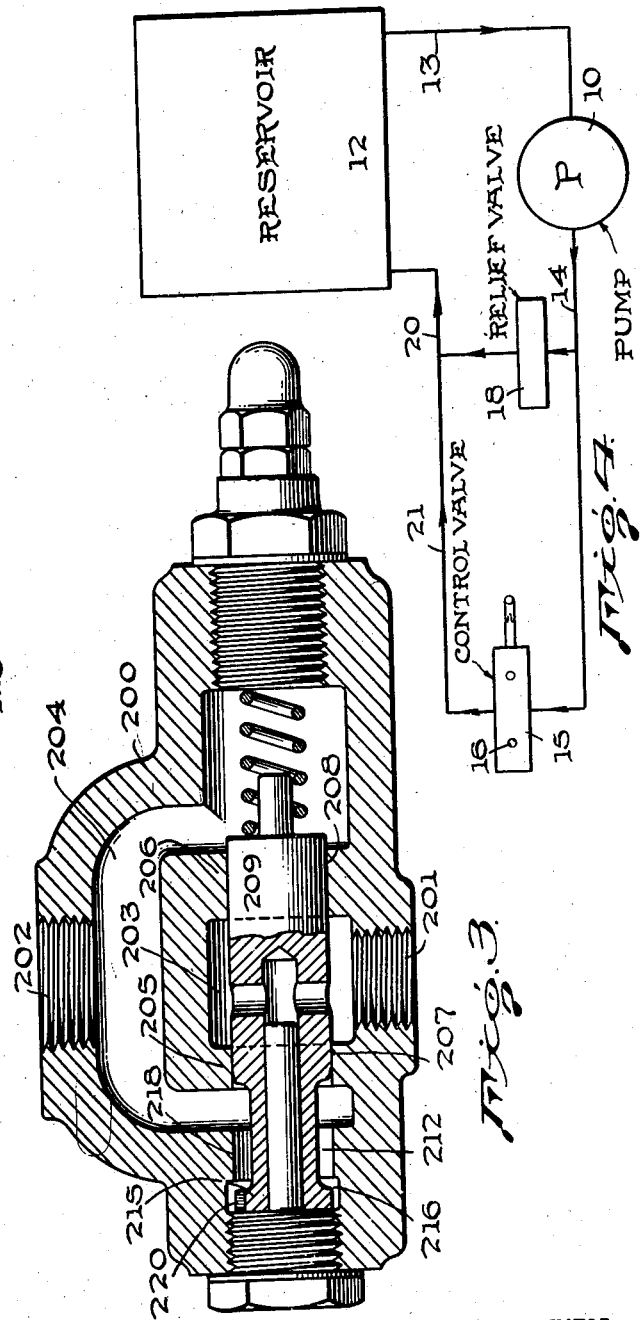
INVENTOR.
HALL KIRKHAM
BY
ATTORNEYS Patented Apr. 26, 1949

2,468,079

UNITED STATES PATENT OFFICE 2,468,079

RELIEF VALVE

Hall Kirkham, Cleveland Heights, Ohio, assignor, by mesne assignments, to Hydraulic Equipment Company, Cleveland, Ohio, a corporation of Ohio Application June 21, 1943, Serial No. 491,692

17 Claims. (Cl. 137—53)

This invention relates to pressure relief valves and more particularly to such valves for use in hydraulic systems to prevent the overloading of the pump or other source of liquid supply.

It is a general object of the present invention to provide novel and improved forms of hydraulic pressure relief valves.

More particularly, it is an object of the invention to provide a hydraulic relief valve capable of easily and smoothly handling large volumes of hydraulic fluids and which is extremely simple in construction.

An important object of the invention consists in the formation of a relief valve adapted to have the plunger arranged in a housing between high and low pressure chambers and which is of uniform external diameter for simplicity in construction of both the movable portion of the valve and the housing.

An important feature of the invention consists in the novel arrangement of the parts of a relief valve whereby it is capable of handling large volumes of oil under the control of an extremely small light weight spring and in which coaxial bores of different diameters are entirely avoided in the housing.

Another important feature of the invention resides in the use of a small secondary plunger substantially entirely housed in the main valve plunger and adapted to provide the effective area against which the excess pressure operates to move the valve to open position against a biasing spring.

Other and further objects and features of the invention will be more apparent to those skilled in the art upon a consideration of the accompanying drawings and following specification wherein are disclosed several exemplary embodiments of the invention with the understanding that such modifications and combinations thereof may be made as fall within the scope of the appended claims without departing from the spirit of the invention.

In said drawings:

Fig. 2 is a view similar to Fig. 1 but showing a modified construction of the relief valve and a different form of housing intended to be used as a portion of a multiple unit valve assembly;

Fig. 3 illustrates a further embodiment of both the valve structure and the housing, the latter being self contained and adapted to be connected by pipes into a hydraulic circuit; and Fig. 4 illustrates diagrammatically a simple hydraulic circuit such as adapted for use with a valve constructed in accordance with the present invention.

Figure 1:
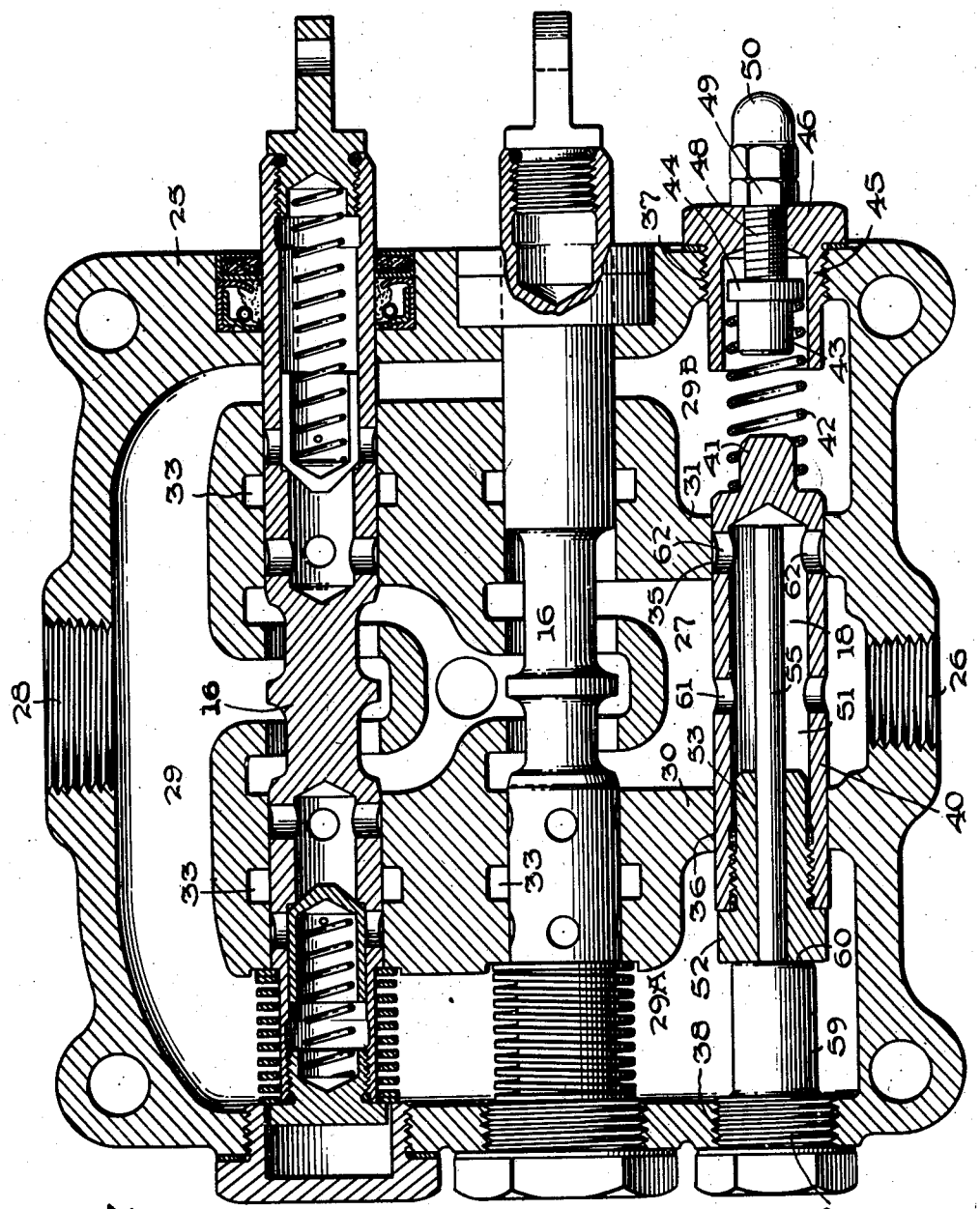
Fig. 1 is a longitudinal section through a valve constructed in accordance with the present invention shown in a unit housing also containing a pair of hydraulic control valves.

In hydraulic control systems of the type using a reservoir for the hydraulic liquid and a positive displacement pump for supplying the same under high pressure to a hoist, ram or similar force exerting device, there are occasions in the operation when the flow of liquid from the pump is shut off or seriously hampered in flow so that the pressure at the pump or elsewhere in the system becomes too great. Under such conditions, if relief is not provided, the pump or some of its driving mechanism may be damaged. In addition the pump wears too rapidly when operated against extremely high pressures and consumes too much power.

In accordance with the present invention novel relief valves are provided each of which is adapted to be inserted between the high pressure side of the pump and the reservoir, which will open at a predetermined and adjusted high pressure to relieve the same by permitting the pump to discharge directly to the tank or reservoir and which will automatically close when the cause of the excess pressure is removed.

Such a system in its simplest form is illustrated in Fig. 4 where the pump, shown at 10, is adapted to receive hydraulic fluid from a suitable reservoir 12 through a pipe 13. The pump discharges into pipe 14 leading to a control valve 15 from which the high pressure fluid may be delivered from port 16 to a hoist or the like (not shown). The control valve permits the admission of the fluid to the hoist or shuts off communication between the pump and the hoist. When this valve is closed it will be seen that the pump pressure will rise excessively unless it can be relieved through a valve such as that shown at 18 connected between the outlet pipe 14 of the pump and a pipe 20 leading back to the reservoir.

A valve of this type, spring pressed closed, will open at a predetermined adjusted pressure and prevent damage to the pump. The control valve 15 is also arranged to vent the liquid from the hoist back to the reservoir 12 through pipe 21 when it is desired to lower or retract the hoist. The valve 15 illustrated is of the double acting type, intended to provide pressure optionally to either end of a double acting hoist but obviously the relief valve 18 will function with either double or single acting hoists and can be used where a plurality of hoists, each under control of a separate control valve, are operated from the same pump and reservoir.

In Fig. 1 the relief valve 18 is shown combined with a pair of control valves 16 all in a common housing 25 conveniently formed as a casting of unitary construction provided with a number of cored passages and chambers. The housing contains an inlet port 26 delivering high pressure oil from a pump to a high pressure chamber 27. There is an exit or low pressure port 28 in communication with a low pressure chamber 29 which divides into two parts 29A on the left and 29B on the right. It will be seen that the high pressure chamber 27 may be said to be separated by walls 30 and 31 from the two parts of the low pressure chamber.

The high pressure chamber, in this construction, is connected through to the low pressure chamber by tortuous paths leading around the control valve plungers 16, when they are in their central positions as shown. This means that the pump, which is connected to the inlet 26 can freely circulate liquid back to the tank, which is connected to the outlet 28. In the event that either of the control valves is moved to the right or the upper one to the left, (the upper one being of the double acting variety and the intermediate one of the single acting type), the tortuous passages will be closed off and the pump will be forced to supply liquid by way of the moved valve to one of the rams or hoists, connected through ports (not shown) to the valve chambers 33. Under these conditions the chamber 27 is filled with oil substantially at pump pressure and the chambers 29A and 29B with oil at tank pressure which is near to zero.

To relieve this high pressure, when it becomes excessive and above that necessary for actuating the hoists, the relief valve of the present invention is introduced between the two chambers and adapted to automatically connect one to the other for relief purposes. The relief valve is adapted to fit in a pair of bored openings 35 and 36 of identical diameter and having a common axis. This bore may be formed simultaneously with the bores 37, 38 in outer walls of the housing by introducing a drill from either end. The bores 37 and 38 are each shown as threaded and closed by an appropriate fluid-tight plug. The outer openings provide access for inserting the valve plunger and its associated parts. The bores 37 and 38 may be enlarged over the diameters of the holes 35 and 36 but do not of necessity have to be coaxial therewith so that no great degree of accuracy is necessary in their formation.

The movable portion of the valve is a cylindrical plunger member 40 entirely integrally closed at the right hand end and having a reduced stem 41 forming a seat for the left hand end of the light helical spring 42 the opposite end of which is mounted on a stem 43 having a head 44 loosely slidable in the sleeve like extension 45 of the plug 46 in the bore 37. An adjusting screw 48 extending through the head of the plug permits adjustment of the tension of the spring and is locked in position by a lock nut 49 and leakage is prevented by means of a cap nut 50.

The cylindrical valve member is provided with a central cavity 51 closed at the left hand end by a threaded plug 52 centrally bored as at 53, although exact concentricity is unimportant, to provide a sliding oil tight fit for a secondary plunger or pin 55, having an overall length such that when its outer end is flush with the outer end of the plug 52 the inner end is clear of the end of the cavity 51 opposite the plug.

A threaded plug 57 closes the bore 38 in the left end of the housing and carries an extension 59 having a flat inner end 60 forming a common stop for the left end of the valve plunger and the secondary plunger or pin 55.

The cavity 51 in the valve plunger is at all times connected to the high pressure chamber 27 by means of radial bores 61. Additional radial bores 62 extend from the right hand end of the cavity to the surface of the valve plunger, but are so positioned longitudinally thereof that when the plunger is held against the stop 60 under the action of the light spring 42 these radial bores 62 are closed by the walls of the bore 35 in one of the partition or separating walls between the high and low pressure chambers.

In operation the valve plunger normally assumes the position shown in the figure and since it fully closes both of the bores 35 and 36 it provides no communication between the high and low pressure chambers until it is moved to the right and the ports 62 are uncovered in the low pressure chamber. Fluid may then flow in through 61, through the chamber 51 and out through ports 62, providing a large flow capacity because of the number and size of the ports 61 and 62. The valve is normally balanced except as later explained because both ends of like diameter are exposed in low pressure chambers while only the center is exposed in the high pressure chamber. It is likewise balanced radially because of the opposite disposition of ports 62, eliminating any tendency to bind.

Unbalanced pressure to move the valve longitudinally against its biasing spring is effected by means of the secondary plunger or pin. The high pressure fluid within the cavity 51 can only act to the left on an annular area which is the difference between the area of the bore 51 and of the bore 53 while at the right hand end of the plunger it acts on the whole area of the bore 51. This is true because the pin 55 is slidable with respect to the valve plunger and is normally held against the stop 60 by the pressure of the oil on its right hand end. The pressure equivalent to that applied against the end of the small pin is therefore that which tries to move the valve against the bias spring.

Because of the small area over which the fluid pressure acts the spring 42 can be small in size, light in weight and readily housed in the small space allotted thereto. By adjusting the pressure of the spring the valve can be made to commence to open at any pressure desired. Obviously the degree of opening will depend upon the amount of pressure in excess of that necessary to start the opening and upon the rate of the spring. The construction of the valve plunger and its part of the housing is extremely simple and since there are not required to be bores of different diameters concentrically or coaxially arranged the construction effort is reduced to a minimum and no great accuracy is required.

The valve of Fig. 1 is hollow and the fluid flows through the same when communicating between the high and low pressure chambers. In the valves of Figs. 2 and 3 this is not true. They are of the spool type having a reduced external diameter for a part of their length which forms a channel adapted to span the bore in one of the separating partition walls to permit exchange of liquid from the high to the low pressure chamber.

Referring now to Fig. 2 the housing 100 is shown as constructed to form a portion of a multiple unit valve housing. This portion combines the one closing end and the high pressure inlet port 126. The far side of the valve 127 is adapted to be mated with a second valve section, for instance one holding a single or double acting valve plunger of the controlling type such as shown in Fig. 1. In any event this housing section has a high pressure chamber 127 and the spaced low pressure chambers 129 separated by the partition walls 130 and 131, bored as at 136, 136 to accomodate the valve plunger 140 which abuts against a stop at the left hand end, forming a portion of the plug 159, against which it is held by the spring 142 constructed, mounted and adjusted in the same manner as described in connection with Fig. 1.

The only chamber in the valve plunger is however the small central bore 160 in which is reciprocably mounted the secondary plunger or pin 155. This bore 160 is somewhat longer than the pin and its inner end is connected by openings 161 to the high pressure chamber whereby the action of the high pressure fluid functions to move the valve against the spring over an area equivalent to the diameter of the pin 155. The valve plunger 140 is cylindrical and of uniform diameter except for a short, reduced portion 170 which is normally housed in the high pressure chamber. This reduced diameter provides a channel 171 which when the valve moves to the right provides for flow of fluid from the high pressure to the low pressure chamber through the bore 136.

The right hand end 172 which is of the full diameter of the valve plunger and which normally closes the bore 136, has its left hand end slightly tapered as at 173 to provide for gradual opening and closing, to eliminate chattering and to permit of accurate regulation of quantity of fluid relieved.

The construction in the case of Fig. 2 is somewhat simpler than that in Fig. 1 since the valve plunger does not need to be provided with a threaded end plug. This valve is equally as balanced both statically and dynamically as that of Fig. 1 and can of course be housed, with slight modifications in the same type of housing shown for the earlier form. In fact all of the valve plungers shown in this application are interchangeable in respect to the types of valve housing, where appropriate modifications are made in the partition walls to accommodate them.

In Fig. 3 is shown an extremely simple form of valve intended to be connected in the pipe lines between the pump and reservoir and ahead of the control valve as illustrated in Fig. 4. It is independent of any other forms of valves and hence has a complete housing 200, having a high pressure inlet port 201 and a low pressure outlet port 202 communicating respectively with the high pressure chamber 203 and a U-shaped low pressure chamber 204. The walls 205 and 206 forming a part of the partition separating these two chambers are drilled as at 207 and 208 with coaxial bores of the same diameter, to accommodate the reciprocable valve plunger 209 which is introduced through one of the end plugs in the manner previously described. These plugs respectively form the left end stop and the spring abutment as in previous embodiments.

In this construction the reduced diameter of the reciprocable portion of the valve, which is shown at 212, is normally housed in one of the low pressure compartments so that it must be arranged in the one opposite the spring. The interior of this valve plunger is identical with that described in connection with Figure 2 so that when under the action of high pressure oil the valve plunger is moved to the right the cutaway portion of the same enters into the bore 207 and provides the necessary communication between the high and low pressure chambers to provide the desired relief.

In Fig. 2 the left hand portion of the valve plunger has a long guide or seat in the bore 136 which prevents it from canting when the portion 172 is unsupported during opening. Because of the shorter overall length of the valve of Fig. 3 this arrangement is not feasible and a secondary support beyond the cutaway portion 212 is provided at 215. This portion is normally in the enlargement 216 of the counter bore for the left plug but when the valve begins to move toward open position it engages in the bore 218 coaxial with the bores 207 and 208 and acts as a secondary guide. Its periphery is fluted as shown at 220 so that it will not act as a pump plunger and trap oil behind it. The counter bore 216 is not essential and if desired the bore 218 can be continued to the left as far as the plug so that the fluted portion 220 is fully guided at all times. Another way of arriving at the same result would be to make the fluted portion longer to the right so that it would never fully leave the guidance of the bore 218. Under these conditions the counter bore 216 could be provided if desired for convenience in threading for the end plug.

It will be noted that in every embodiment of the invention the valve plunger is radially balanced in each compartment in which it is exposed preventing any binding from unequal pressures. Moreover the plunger is externally balanced longitudinally and only internal unbalance causes it to move against the bias. All of the embodiments provide adjustment for the spring and the adjusting screw passes into the low pressure compartment where it is more readily kept tight against leakage.

What I claim is:

1. In a valve device of the type described, in combination, a housing, means dividing said housing into an inlet or high pressure chamber and an exhaust or low pressure chamber, a reciprocable cylindrical valve extending through said means and radially balanced in the two chambers, said valve having a central internal cavity always in communication with the high pressure chamber, a biasing spring for said valve and means having a working fit in said cavity to longitudinally unbalance said valve for movement against said bias to connect said chambers.

2. In a valve device of the type described, in combination, a housing, means dividing said housing into an inlet or high pressure chamber and an exhaust or low pressure chamber, a reciprocable cylindrical valve extending through said means and radially balanced in the two chambers, said valve having a central cavity always in communication with the high pressure chamber, a biasing spring for said valve, means in said cavity to longitudinally unbalance said valve for movement against said bias to connect said chambers and a passage from said cavity to the surface of the valve positioned to communicate with the low pressure chamber upon said movement.

3. In a valve device of the type described, in combination, a housing, means dividing said housing into an inlet or high pressure chamber and exhaust or low pressure chambers straddling said high pressure chamber, a reciprocable, cylindrical valve extending through said means and having its center in the high pressure chamber and its ends radially balanced in the two low pressure chambers, said valve having a central cavity always open to the high pressure chamber, a biasing spring for said valve and pressure responsive means in said cavity to longitudinally unbalance said valve for movement against said bias to connect said chambers.

4. In a valve device of the type described, in combination, a housing, means dividing said housing into an inlet or high pressure chamber and exhaust or low pressure chambers straddling said high pressure chamber, a reciprocable, cylindrical valve extending through said means and having its center in the high pressure chamber and its ends radially balanced in the two low pressure chambers, said valve having a central cavity always open to the high pressure chamber, a biasing spring for said valve and pressure responsive means in said cavity to longitudinally unbalance said valve for movement against said bias, and means on said valve forming a passage between the high and low pressure chambers when the valve is moved against said bias.

5. In a valve device of the type described, in combination, a housing, means dividing said housing into an inlet or high pressure chamber and exhaust or low pressure chambers straddling said high pressure chamber, a reciprocable, cylindrical valve extending through said means and having its center in the high pressure chamber and its ends radially balanced in the two low pressure chambers, said valve having a central cavity always open to the high pressure chamber, a biasing spring for said valve and pressure responsive means in said cavity to longitudinally unbalance said valve for movement against said bias and a passage from said cavity to the surface of said valve positioned to communicate with the low pressure chamber upon said movement.

6. In a valve device of the type described, in combination, a housing, spaced walls dividing said housing into a single inlet or high pressure chamber and a two-part exhaust or low pressure chamber, uniform aligned bores in said walls, a reciprocable cylindrical valve extending through said bores and radially balanced in each of the two chambers, said valve having a central cavity always in communication with the high pressure chamber, a biasing spring for said valve, means in said cavity to longitudinally unbalance said valve for movement against said bias, and a passage in said valve to connect said chambers when the valve is moved against said bias.

7. In a valve device of the type described, in combination, a housing, spaced walls dividing said housing into a central inlet or high pressure chamber and a two part exhaust or low pressure chamber, uniform aligned bores in said walls, a reciprocable cylindrical valve extending through said bores and radially balanced in each of the two chambers, said valve having a central cavity always in communication with the high pressure chamber, a biasing spring for said valve, a longitudinal bore extending from the cavity through the end of the valve opposite the spring, a close fitting pin in said valve bore, a stop on said housing for said pin, and a passage in said valve to connect said chambers when the valve is moved against said bias.

8. In a valve device of the type described, in combination, a housing, walls dividing said housing into an inlet or high pressure chamber and an exhaust or low pressure chamber partially surrounding said high pressure chamber, spaced, aligned bores in two of said walls, a reciprocable cylindrical valve extending through said bores and radially balanced in each of the two chambers, a biasing spring for said valve, a longitudinal bore in said valve extending from the end opposite the spring, the inner end of the valve bore being always in communication with said high pressure chamber, a close fitting pin slidable in said valve bore, a stop for that end of said pin which extends from the valve bore, and a channel in said valve adapted to span one of said first mentioned bores when the valve is moved by excess pressure to provide communication between the said chambers.

9. In a valve device of the type described, in combination, a housing, walls dividing said housing into an inlet or high pressure chamber and an exhaust or low pressure chamber partially surrounding said high pressure chamber, spaced, aligned bores in two of said walls, a reciprocable cylindrical valve extending through said bores and radially balanced in each of the two chambers, a biasing spring for said valve, a longitudinal bore in said valve extending from the end opposite the spring, the inner end of the valve bore being always in communication with said high pressure chamber, a close fitting pin slidable in said valve bore, a stop for that end of said pin which extends from the valve bore, and a channel in said valve normally housed in said high pressure chamber and adapted to span one of said first mentioned bores when the valve is moved by excess pressure to provide communication between the said chambers.

10. In a valve device of the type described, in combination, a housing, walls dividing said housing into an inlet or high pressure chamber and an exhaust or low pressure chamber partially surrounding said high-pressure chamber, spaced, aligned bores in two of said walls, a reciprocable cylindrical valve extending through said bores and radially balanced in each of the two chambers, a biasing spring for said valve, a longitudinal bore in said valve extending from the end opposite the spring, the inner end of the valve bore being always in communication with said high pressure chamber, a close fitting pin slidable in said valve bore, a stop for that end of said pin which extends from the valve bore, and a channel in said valve normally housed in said low pressure chamber and adapted to span one of said first mentioned bores when the valve is moved by excess pressure on said pin to provide communication between said chambers.

11. In a relief valve device for hydraulic systems, in combination, a housing having an inlet for high pressure oil and an outlet for low pressure oil, partition walls dividing the housing into a high pressure chamber at least partially within a low pressure chamber, a pair of the same diameter aligned bores in two of said walls, a cylindrical valve adapted to closely fit said aligned bores and normally separate the chambers, an adjustable spring bearing on one end of said valve, a passage extending into said valve from the opposite end, means connecting the inner end of said passage with the high pressure chamber, a pin of less length than and slidable in the passage in said valve and a single stop for the outer end of the pin and the corresponding end of the valve.

12. In a relief valve device for hydraulic systems, in combination, a housing having an inlet for high pressure oil and an outlet for low pressure oil, partition walls dividing the housing into a high pressure chamber at least partially within the confines of a low pressure chamber, a pair of the same diameter aligned bores in two of said walls, a cylindrical valve adapted to closely fit said aligned bores and normally separate the chambers, a spring bearing on one end of said valve, a passage extending into said valve from the opposite end, means connecting the inner end of said passage with the high pressure chamber, a pin of less length than and slidable in the passage in said valve, a single stop for the outer end of the pin and the corresponding end of the valve, a portion of the valve being of reduced diameter adjacent the said stop end to span the bore in the adjacent wall when the valve is moved against said spring.

13. In a relief valve device for hydraulic systems, in combination, a housing having an inlet for high pressure oil and an outlet for low pressure oil, partition walls dividing the housing into a high pressure chamber at least partially within a low pressure chamber, a pair of the same diameter aligned bores in two of said walls, a cylindrical valve adapted to closely fit said bores and normally separate the chambers, a spring bearing on one end of said valve, a bore extending into said valve from the opposite end, means connecting the inner end of said valve bore with the high pressure chamber, a pin of less length than and slidable in the bore in said valve, a single stop for the outer end of the pin and the corresponding end of the valve, a portion of the valve being of reduced diameter adjacent the inner side of the wall at the spring end to span the bore in that wall when the valve is moved against said spring.

14. In a relief valve device for hydraulic systems, in combination, a housing having an inlet for high pressure oil and an outlet for low pressure oil, partition walls dividing the housing into a high pressure chamber at least partially within a low pressure chamber, a pair of the same diameter aligned bores in two of said walls, a cylindrical valve adapted to closely fit said bores and normally separate the chambers, an adjustable spring bearing on one end of said valve, a bore extending into said valve from the opposite end, means connecting the inner end of said valve bore with the high pressure chamber, a pin of less length than and slidable in the bore in said valve, a single stop for the outer end of the pin and the corresponding end of the valve, a radial bore in said valve connected to said longitudinal bore and normally closed by the wall of the bore in the partition wall adjacent the spring, and said radial bore being adapted to be uncovered to connect the high and low pressure chambers when the valve is moved against said spring.

15. In a valve device of the type described, in combination, a housing, means dividing said housing into a high pressure chamber and a low pressure chamber, a hollow, cylindrical valve extending reciprocably with a close fit through said means, positionable to open or close communication between said chambers, and externally radially and longitudinally balanced in the two chambers, a biasing spring to hold said valve closed and means movable relative to and at least partially within the valve to provide an internal pressure area to unbalance said valve for movement against said bias to connect said chambers upon excess high pressure.

16. In a relief valve device of the type described, in combination, a housing, means dividing said housing into a high pressure chamber and straddling low pressure chambers, a hollow, cylindrical valve reciprocable with a close fit through said means, positionable to open or close communication between said high and low pressure chambers and having its center in the high pressure chamber and its ends externally radially and longitudinally balanced in the two low pressure chambers, a port connecting the hollow of said valve always to the high pressure chamber, a biasing spring to hold said valve in closed position and independent pressure responsive means in the valve to longitudinally unbalance said valve internally for movement against said bias to connect said chambers.

17. In a valve device of the type described, in combination, a housing, spaced walls dividing said housing into a single inlet or high pressure chamber and a two part exhaust or low pressure chamber, uniform aligned bores in said walls, a hollow, cylindrical valve extending reciprocably with a working fit through said bores and radially and longitudinally externally balanced in each of the two chambers, a port connecting the valve interior to the inlet chamber, a biasing spring for said valve, means at least partially within the valve to longitudinally unbalance the same interiorly for movement against said bias under excess inlet pressure, and a passage in said valve to connect said inlet and exhaust chambers when the valve is moved against said bias.

HALL KIRKHAM.

REFERENCES CITED

The following references are of record in the file of this patent:

UNITED STATES PATENTS

| Number | Name | Date |
|---|---|---|
| 572,297 | Hennebohle | Dec. 1, 1896 |
| 715,706 | Tippett | Dec. 9, 1902 |
| 1,114,978 | Gamble | Oct. 27, 1914 |
| 1,620,321 | Browne | Mar. 8, 1927 |
| 1,785,807 | Carpenter | Dec. 23, 1930 |
| 1,980,478 | Frentzel | Nov. 13, 1934 |
| 1,994,320 | McLaughlin | Mar. 12, 1935 |
| 2,200,824 | Herman | May 14, 1940 |
| 2,286,027 | Towler | June 9, 1942 |
| 2,308,753 | Hart | Jan. 19, 1943 |
| 2,317,332 | Rappl | Apr. 20, 1943 |
| 2,333,522 | Clifton | Nov. 2, 1943 |